March 21, 1939.  J. H. PLOEHN  2,151,045
WHEEL MOUNTING
Filed Oct. 22, 1935
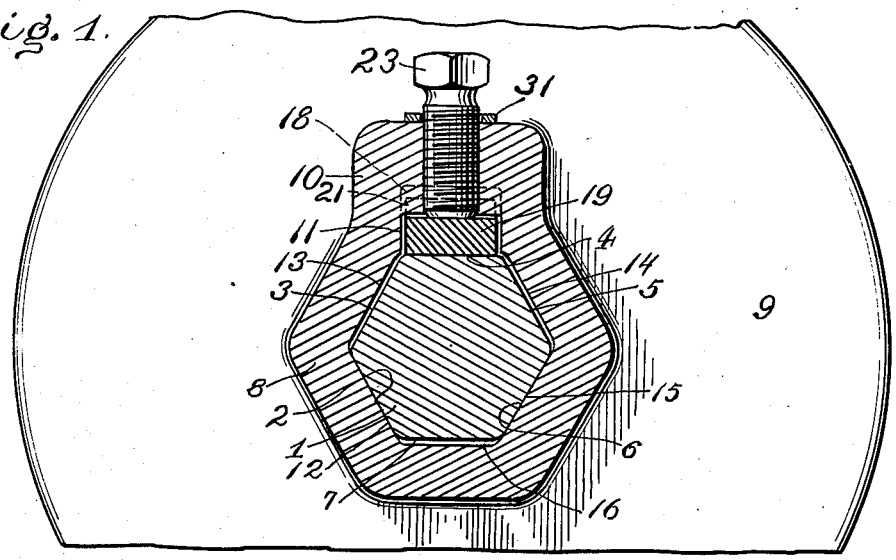
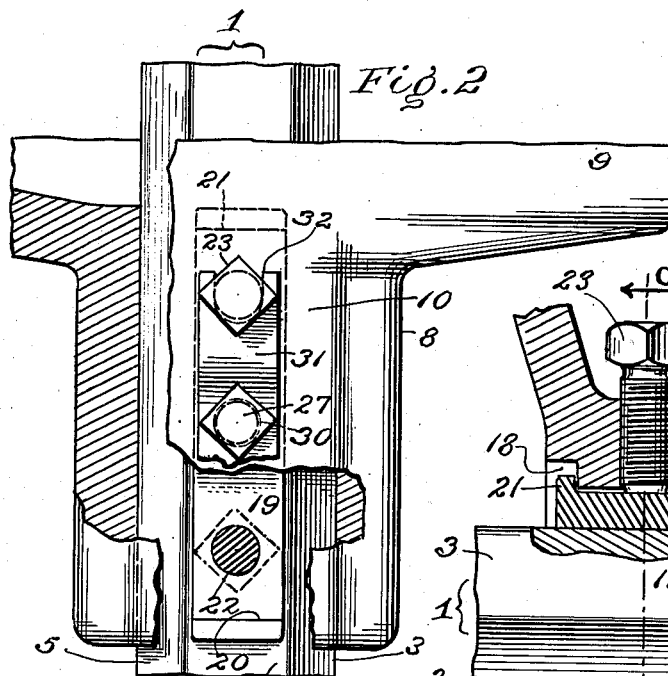
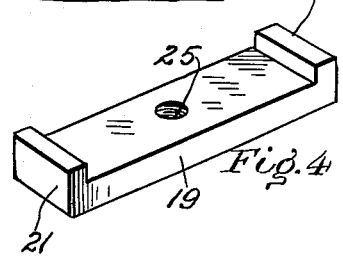
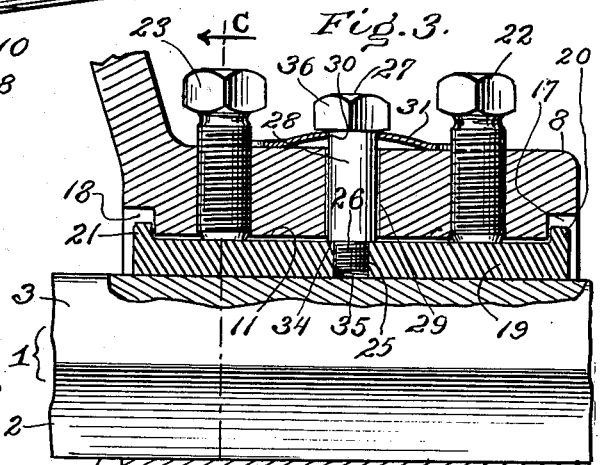
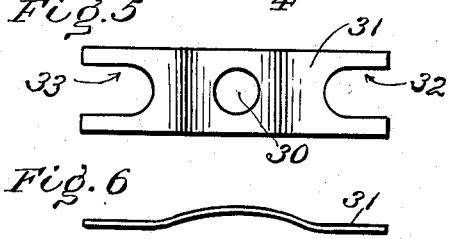
INVENTOR.
John H. Ploehn
BY
Morrison, Kennedy & Campbell
ATTORNEYS.

Patented Mar. 21, 1939

2,151,045

UNITED STATES PATENT OFFICE 2,151,045

WHEEL MOUNTING

John H. Ploehn, Bettendorf, Iowa, assignor to French & Hecht, Incorporated, a corporation of Iowa Application October 22, 1935, Serial No. 46,073

8 Claims. (Cl. 287—52.08)

This invention relates to the mounting of a wheel on a rotary axle and has particular reference to the mounting of a tractor wheel on an axle for the purpose set forth more fully hereinafter.

Because of the different types of work for which a tractor may be employed, it is frequently desirable that the track of the wheels, that is, the lateral distance between them, be increased or lessened as required. Several schemes have been devised for varying the track of wheels, such as reversing the wheels, reversing or interchanging the wheel treads, and shifting the wheels to different positions along the axle, which is extended for that purpose. The latter scheme of course is more easily carried out because it does not require the removal of the wheel from the axle or the tread from the wheel, but in the case of a driving wheel, the manner of securing the wheel to the axle presents difficulties. For example, if the wheel is keyed or splined to an axle which is circular in cross section, as is most common, there must be a close machined fit between the hub of the wheel and the axle as well as between the key and keyway or the splines and grooves in order to prevent shearing of the key or splines due to torque strains. Hence, when the track of the wheels is not varied frequently, rust and foreign matter collecting on the exposed portion of the axle render the shifting of the wheel a difficult and laborious task. On the other hand, if splines and keyways are done away with and a frictional engagement between the axle and the wheel securing means alone is relied upon, the torque strains to which the securing means is subjected soon cause slippage and wear of the parts, which is troublesome and ultimately leads to expensive repair or replacement and loss of the use of the tractor for a time. In short, either a splined or an unsplined axle which is circular in cross section is unsatisfactory when employed in connection with wheels adjustable laterally on the axle.

The present invention contemplates an axle and a wheel hub formed so that the hub fits loosely on the axle to permit the easy location of the wheel in different axial positions thereon and yet has a solid engagement with the axle when secured in any desired position; and this whether the cooperative portions of the hub and axle are machine finished or not. Specifically, the axle is formed polygonal in cross section so as to present a plurality of wide inclined bearing surfaces extending axially thereof and the inside or axle engaging portion of the hub is formed with similar bearing surfaces and equipped with a resiliently mounted pressure-bar movable radially and adapted to be forced against the axle by bolts threaded in the hub to move the hub radially relatively to the axle and effect a wedging engagement of cooperative bearing surfaces on the hub and axle, the resilient mounting of the pressure-bar being such as to render it self-operative to break its engagement with the axle when the wheel is loosened for adjustment.

In the accompanying drawing the invention has been shown merely by way of example and in preferred form, and obviously many variations and modifications may be made therein which will still be comprised within its spirit. It is to be understood, therefore, that the invention is not limited to any specific form or embodiment except insofar as such limitations are specified in the appended claims.

Referring to the drawing:

Fig. 1 is a sectional elevation of the wheel hub and axle assembly taken on the line C—C of Fig. 3;

Fig. 2 is a top plan view of the wheel hub and axle assembly, the hub being partly broken away to show the relation of the parts;

Fig. 3 is a longitudinal sectional elevation through the wheel hub, the axle being partly broken away;

Fig. 4 is a perspective view of the pressure bar for securing the wheel to the axle;

Fig. 5 is a top plan view of a leaf spring associated with the wheel securing means; and Fig. 6 is a side elevation of the leaf spring.

In the preferred embodiment of the invention illustrated in the drawing, the axle 1 is hexagonal in cross section, presenting wide bearing surfaces 2, 3, 4, 5, 6 and 7 which extend axially thereof. The hub 8 of the wheel 9 is similar in cross section but is thickened at one side, as at 10, and formed with a recess 11, thus presenting only five bearing surfaces 12, 13, 14, 15 and 16. The recess 11 extends axially through the hub 8 and at opposite ends of the hub is deepened as at 17 and 18. A pressure-bar or key-bar 19 is fitted loosely in the recess 11 and formed at opposite ends with flanges 20 and 21 which seat, respectively, in the deepened end recesses 17 and 18, as shown in Fig. 3. A pair of bolts 22, 23 are arranged in the thickened portion 10 of the hub 8 so that they engage the radially outer flat face of the pressure-bar 19 near opposite ends for the purpose of moving the pressure-bar radially in the recess 11 into engagement with the bearing surface 4 of the axle. The pressure-bar 19 is drilled and tapped about midway of its length, as at 25, to receive the threaded end 26 of a tap-bolt 27, the enlarged shank 28 of which passes freely through a drill hole 29 in the hub and through an opening 30 in a leaf spring 31 arranged exteriorly of the hub and formed with bifurcated ends 32 and 33 which hold it against displacement by straddling, respectively, the bolts 22, 23.

The bearing surfaces of the axle are of substantially equal width; while the bearing surface 16 of the hub is narrower and the remaining surfaces 12, 13, 14 and 15 are wider than those of the axle. The narrow hub surface 16 is diametrically opposite the pressure-bar 19, and when the hub is moved radially relatively to the axle by the adjustment or setting up of the bolts 22, 23, the two inclined surfaces 12 and 15 on opposite sides of the narrow surface 16 are brought into wedging engagement with the respective cooperative bearing surfaces 2 and 6 of the axle and the wheel thus solidly secured to the axle. Since the axle bearing surfaces are all of equal width, there are no corresponding hub and axle surfaces which must be matched in fitting the hub on the axle, and, hence, the hub can be slid onto the axle with its two operative surfaces 12 and 15 in position to cooperate with any two respective cooperative surfaces of the axle.

The axle 1 is extended to permit the wheel 9 to be located in different positions lengthwise thereof. When the bolts 22 and 23 are loosened, there is considerable clearance between the hub and axle bearing surfaces and the wheel may be moved easily along the axle, the pressure-bar 19 being carried with it since it is held against displacement by the flanges 20 and 21 seating in the end recesses 17 and 18 and by the tap bolt 26, and in any set position the wheel may be solidly secured to the axle. It is only necessary that the bolts 22 and 23 be set up sufficiently to effect the wedging engagement of the hub and axle bearing surfaces and, hence, the threads of the bolts are not excessively strained by tightening and are better able to withstand the tension which torque places upon them. Moreover, the frictional engagement of the wedged bearing surfaces acts to lessen the tension on the bolt threads.

Besides serving to hold the pressure-bar 19 in position, the tap-bolt 27 and leaf spring 31 perform still other functions. The enlarged shank 28 of the bolt 27 presents a shoulder 34 which limits the extent to which the bolt can be screwed into the pressure-bar 19, thereby preventing the threads of the bolt from being overrun by setting it up too tightly and thus avoiding the possibility of the end 35 of the bolt protruding beyond the inner surface of the pressure-bar, rendering the pressure-bar ineffective and resulting in a diminution of the definite distance which the shank 28 maintains between the head 36 and the threaded end 26 of the bolt 27. This is important since the shank 28 is of such length that when the bolts 22 and 23 are loosened to the extent that the pressure-bar 19 contacts the inner surface of the hub recess 11 in which it seats, the spring 31 is slightly compressed. When the bolts 22 and 23 are set up to secure the wheel to the axle, moving the pressure-bar 19 before them, the bolt 27 is carried along with the pressure-bar and the spring 31 further compressed. Of course, the bifurcations 32 and 33 are deep enough to allow the spring 31 to flatten out in being compressed, without the bottoms of the bifurcations engaging the bolts 22 and 23. The compressed spring 31 exercises itself to cause the pressure-bar 19 to tend to resume its inactive position and, hence, the pressure-bar always engages the inner ends of the bolts 22 and 23 and follows them when they are being loosened, so that, since it retreats into the recess 11, it is self-operative to break its engagement with the axle. Thus the adhesion of the pressure-bar 19 to the axle, which frequently occurs, is obviated and by merely loosening the bolts 22 and 23 the wheel is free to be adjusted, or completely removed from the axle without danger of the pressure-bar falling out of the hub onto the ground. Moreover, the pressure-bar 19 being held by the spring 31 in the bottom of the recess 11, no manipulation is required to keep it in place when the removed wheel is being replaced on the axle.

Although the axle could be formed of any one of several different non-circular cross sectional shapes, if it presented flat bearing surfaces only two of them would cooperate with a corresponding number of hub surfaces. At least one flat inclined surface is desirable in order that a wedging engagement between the hub and axle may be obtained, but two flat surfaces of course give greater bearing surface area. The wedging engagement of the hub and axle eliminates relative rotation between them and the consequent shearing of the parts caused by such rotation. The hexagonal axle is preferable because it offers wide bearing surfaces in an axle having a uniform, nearly circular cross section and, therefore, substantially equally torque resistant throughout. It is also pointed out that the resiliently mounted pressure-bar is capable of use with any modified form of the invention.

Having thus described my invention, what I claim is:

1. Running gear for a land vehicle, including a rotary axle non-circular in cross section, a wheel having a hub formed with an inner surface non-circular in cross section, the hub being adapted to fit the axle loosely for movement of the wheel to different positions axially thereof, means resiliently mounted in the hub for self-retraction and movable relatively to the hub into engagement with the axle, and means for moving said resiliently mounted means to effect a clamping engagement of the axle and inner surface of the hub to secure the wheel to the axle in said different positions.

2. Running gear for a land vehicle, including a rotary axle polygonal in cross section and presenting a plurality of bearing surfaces extending axially thereof, a wheel having a hub adapted to fit the axle loosely and formed with an axle engaging portion presenting a plurality of cooperative bearing surfaces, the hub being slidable on the axle to locate the wheel in different positions axially thereof, a recess formed in the hub and extending axially thereof, a resiliently mounted movable pressure bar arranged in said recess, and means for moving the pressure bar against the axle to effect a radial movement of the hub relatively to the axle to draw bearing surfaces of the hub into wedging engagement with respective cooperating bearing surfaces of the axle for securing the wheel to the axle in said different positions, the resilient mounting for the pressure bar including a spring arranged to exercise itself to tend to maintain the pressure bar disengaged from the axle and render the pressure bar self-operative to break its engagement with the axle when the bar moving means is released to loosen the wheel on the axle.

3. Running gear for a land vehicle, including a rotary axle formed with a plurality of flat bearing surfaces extending axially thereof, a wheel having a hub adapted to fit loosely on the axle for movement of the wheel to different positions axially thereof and being formed with a plurality of flat bearing surfaces adapted to engage bearing surfaces of the axle, said hub being equipped with means for securing the wheel to the axle in said different positions comprising a pressure bar extending axially of the hub and arranged to engage the axle, a leaf spring arranged exteriorly of the hub, means passing freely through an aperture in the hub and connecting the pressure bar and spring, and adjustable means arranged in the hub and actuable to move the pressure bar against the axle and cause the hub to move relatively to the axle and effect a wedging engagement of cooperative hub and axle bearing surfaces, thereby compressing the spring and rendering it operable to exercise itself to break the engagement of the pressure bar with the axle when said adjustable means is actuated to loosen the wheel on the axle.

4. Running gear for a land vehicle, including a rotary axle, a wheel formed with a hub adapted to fit loosely on the axle for movement of the wheel to different positions axially thereof, means mounted in the hub and engageable with the axle to prevent relative rotation of the hub and axle, and adjustable means acting on said axle engaging means to secure the wheel to the axle in said different positions, said axle engaging means being resiliently mounted in the hub for self-operation to break its engagement with the axle when said adjustable securing means is released.

5. Running gear for a land vehicle, including a rotary axle, a wheel formed with a hub adapted to fit loosely on the axle for movement of the wheel to different positions axially thereof, a recess formed in the hub, means accommodated in said recess and adapted to be projected therefrom to engage the axle to secure the wheel thereto in said different positions and to prevent relative rotation of the wheel and axle, adjustable means for projecting said securing means from said recess, and means other than said adjustable means for retracting said securing means into its accommodating recess when said adjusting means is released.

6. Running gear for a land vehicle, including a rotary axle, a wheel formed with a hub adapted to fit loosely on the axle for movement of the wheel to different positions axially thereof, a recess formed in the hub, means mounted in said recess and adapted to be projected therefrom to engage the axle to secure the wheel thereto in said different positions and to prevent relative rotation of the wheel and axle, and adjustable means for projecting said securing means from said recess, said securing means being resiliently mounted for self-retraction into its accommodating recess when said adjusting means is actuated to loosen the wheel on the axle.

7. Running gear for land vehicles, including a rotary axle and wheel, a hollow hub on the wheel receiving the axle and being movable both axially and radially on the axle, coactive complementary wedge faces on the axle and in the hub adapted in different axial positions of the hub on the axle to be brought through radial movement of the hub relative to the axle into wedging engagement so as to secure the hub rigidly to the axle for rotation of the wheel as an operative unit with the axle, and said coacting wedge faces being releasable from their wedging engagement through reverse radial movement of the hub relative to the axle, and securing means mounted in a recess in the hub for movement relative to both the hub and axle, said locking means being movable in the hub in one direction into operative position to engage the axle and urge the wheel hub radially into wedging engagement of its wedge faces with the complementary wedge faces of the axle, and said locking means being reversely movable away from the axle to inoperative position for release of said wedging engagement and in its inoperative position providing for radial play between the hub and axle enabling the hub to be adjusted in an axial direction freely without binding to different positions along the axle.

8. Running gear for a land vehicle, including a rotary axle hexagonal in cross-section, a wheel having a hub, said hub having a hexagonal axle-receiving opening loosely fitting the axle and providing for radial movement of the hub relative to the axle, the axle having oppositely inclined bearing faces adapted under radial movement of the hub to be brought in and out of wedging engagement with complementary bearing faces of the hub, said bearing faces of the hub differing in width from the complementary bearing faces of the axle, and means for moving the hub radially relative to the axle to effect wedging engagement of the complementary bearing faces of the hub and axle.

JOHN H. PLOEHN.